United States Patent [19]

Beniston et al.

[11] Patent Number: 5,537,469
[45] Date of Patent: Jul. 16, 1996

[54] BANDWIDTH ALLOCATION OF DPNSS NETWORKS

[75] Inventors: Graham Beniston, Leicester; Ian G. Maffett, London; James M. McGarrity, South Humberside, all of England

[73] Assignee: GPT Limited, United Kingdom

[21] Appl. No.: 536,307

[22] Filed: Sep. 27, 1995

Related U.S. Application Data

[63] Continuation of Ser. No. 320,572, Oct. 7, 1994, abandoned, which is a continuation of Ser. No. 34,229, Mar. 22, 1993, abandoned.

[30] Foreign Application Priority Data

Apr. 1, 1992 [GB] United Kingdom ............... 9207101

[51] Int. Cl.⁶ ........................................ H04M 3/64
[52] U.S. Cl. .................. 379/229; 379/230; 379/232; 379/243; 379/221
[58] Field of Search .......................... 379/229, 230, 379/221, 128, 219, 275, 269, 220, 232, 243

[56] References Cited

U.S. PATENT DOCUMENTS

| | | | |
|---|---|---|---|
| 3,906,175 | 9/1975 | Joel, Jr. ............................ | 379/275 |
| 4,559,415 | 12/1985 | Bernard et al. .................... | 179/2 DP |
| 4,587,651 | 5/1986 | Nelson ............................... | 370/88 |
| 4,669,113 | 5/1987 | Ash ..................................... | 379/230 |
| 4,704,724 | 11/1987 | Krishnan ............................ | 379/221 |
| 4,707,853 | 11/1987 | Hasegawa .......................... | 379/128 |
| 4,747,130 | 5/1988 | Ho ...................................... | 379/221 |
| 4,748,658 | 5/1988 | Gopal ................................. | 379/221 |
| 4,788,721 | 11/1988 | Krishnan ............................ | 379/113 |
| 4,862,496 | 8/1989 | Kelly .................................. | 379/221 |
| 4,931,941 | 6/1990 | Krishnan ............................ | 379/220 |
| 4,979,118 | 12/1990 | Kheradpir .......................... | 379/220 |
| 5,042,027 | 8/1991 | Takase ................................ | 379/221 |
| 5,095,505 | 3/1992 | Finucane et al. .................. | 379/219 |
| 5,307,465 | 4/1994 | Iki ....................................... | 379/269 |

*Primary Examiner*—Jeffery Hofsass
*Assistant Examiner*—Scott Wolinsky
*Attorney, Agent, or Firm*—Kirschstein, et al.

[57] ABSTRACT

A method for providing dynamic allocation of trunk circuits of different classes of traffic having different bandwidths in a Digital Private Network Signalling System (DPNSS) link between two switching nodes is disclosed. The trunk circuits are grouped into trunk groups. Trunk Access Class (TAC) is a code used to differentiate different classes of traffic. In the switching nodes, a table exists which defines to which trunk groups access is allowed or barred by TAC whereby bandwidth (or trunks) in the DPNSS link can be allocated by class of traffic. The grouping of trunks into trunk groups and the table which allows or bars access to trunk groups by TAC may be altered from time to time in the switching nodes at each end of the link by management command, to vary the allocation of bandwidth between classes of traffic in the DPNSS link.

3 Claims, 3 Drawing Sheets

BANDWIDTH ALLOCATION OF DPNSS NETWORKS

This application is a continuation of application Ser. No. 08/320,572, filed Oct. 7, 1994, now abandoned, which was a continuation of application Ser. No. 08/034,229, filed Mar. 22, 1993, now abandoned.

BACKGROUND OF THE INVENTION

The need for an intelligent private/public interface manager in a telecommunications system is continually increasing. The real impact of advanced message-based signalling systems on telecommunications networks, and subsequently on all users and system vendors, is only now becoming comprehensible.

The purpose of a Network Services Manager (NSM) is to enable a corporate telecoms manager to use his network as a strategic resource. The NSM will enable him to operate his network more effectively and efficiently, and allow the intelligent use of new public services as they materialize.

Typically, the key features of an NSM are bandwidth management, intelligent routing, service management and public network interfacing, applied to wideband traffic (up to 2 Mbit/s channels) in the first instance.

The key components of an NSM will be a Network Services Switch (NSS)—a DPNSS based switch/crossconnect, and the Network Services Management Center (NSMC).

One of the main services which may be offered by an NSM is intelligent routing. The NSMC typically will have an overview of the type of traffic (voice, video, data), the network topology, the network loading and the network facilities. It is thus able to make decisions about routing strategy in the network. Other components in the network can make decisions about routing in their own sub-networks—e.g. LAN routers in the data sub-network, iSPBXs in the voice sub-network, but only the NSM has the full picture to make the global decisions and influence the workings of the sub-networks.

Routing in the NSM would take place in the NSS. Routing in iSDX networks involves preferred outgoing link capacity checking at the originating and each intermediate node before the destination. This method tends to fill links to capacity, as alternatives are only tried when congestion is encountered. Links are segmented by Trunk Group and some are reserved for incoming only or outgoing only, to prevent either predominating excessively.

If the network is used for calls of all the same type/class, as in standard iSDX networks, then the above scheme works well. However, in the NSM scenario, it is required to distinguish between voice, data, video, and other special traffic categories (e.g. breakout, compressed voice etc.) by type/class. These have different characteristics of call hold time, BHCA, bandwidth required etc., so further optimization could occur. This is achieved by the simple process of allocating traffic characterized by long call holding times and high bandwidth requirement to the shortest route and to the private network.

To accommodate the varying demand for network bandwidth, the NSM should try to spread traffic evenly through the network so that bandwidth is available to any node that might require to increase its data bandwidth to its limit. This could be described as load balancing, and to achieve it, the NSM needs to influence the routing through the network.

SUMMARY OF THE INVENTION

According to the present invention there is provided a method of allocating circuits between switching nodes in a telecommunications system comprising the steps of:
- (i) allocating each circuit between a pair of nodes to a specific Trunk Group having an Access Code;
- (ii) allocating one or more Trunk Groups to a Trunk Access Class (TAC), each TAC being associated with at least one call initiator and restricted to one class of service;
- (iii) dividing the time into bands each of which is allocated to a Zone number;
- (iv) creating Route Restriction Tables for controlling access to Trunk Groups, whereby for each Zone, access to Trunk Groups by a call initiator is restricted to those having a non-barred TAC associated therewith.

There is further provided a method as above, including provision for amending the Trunk Groups, the TACs and the Route Restriction Tables throughout the network simultaneously by creating an additional time band and an additional Zone to which the additional time band is allocated, whereby the allocation of the circuits may be amended at the commencement of the additional time band.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

A DPNSS (Digital Private Network Signalling System) link between two switching nodes comprises a number of circuits. These are grouped into trunk groups. Trunk Access Class (TAC) is a code used to differentiate different classes of traffic. In the switching nodes, a table exists which defines to which trunk groups access is allowed or barred by TAC. This means that bandwidth (or trunks) in the DPNSS link can be allocated by class of traffic.

The present application relates to the dynamic allocation of bandwidth using the above technique. The grouping of trunks into trunk groups and the table which allows or bars access to trunk groups by TAC may be altered from time to time in the switching nodes at each end of the link by management command, to vary the allocation of bandwidth between classes of traffic in the DPNSS link.

The actual bandwidth used by different classes of traffic will vary from zero up to the allocated bandwidth depending on load. Changing the tables in the switching nodes do not affect existing calls, only new calls set up after the change.

A Trunk Group is defined as a collection of circuits on a link or a set of links to the same destination which have a single identifier. Each circuit may only be in one Trunk Group.

The TAC is a code that is sent in the DPNSS signalling information carried with the dialled number and is used to determine if a call can be established using a particular Trunk Group at the given time. A given TAC may be allowed to access a number of Trunk Groups, and similarly, a Trunk Group may be used by calls with a number of different TACs. This access is set up in tables in the switching nodes. TACs are associated with the call initiator (the telephone extension for example) on a DPNSS PABX and are valid throughout the private DPNSS network.

Figure 2:
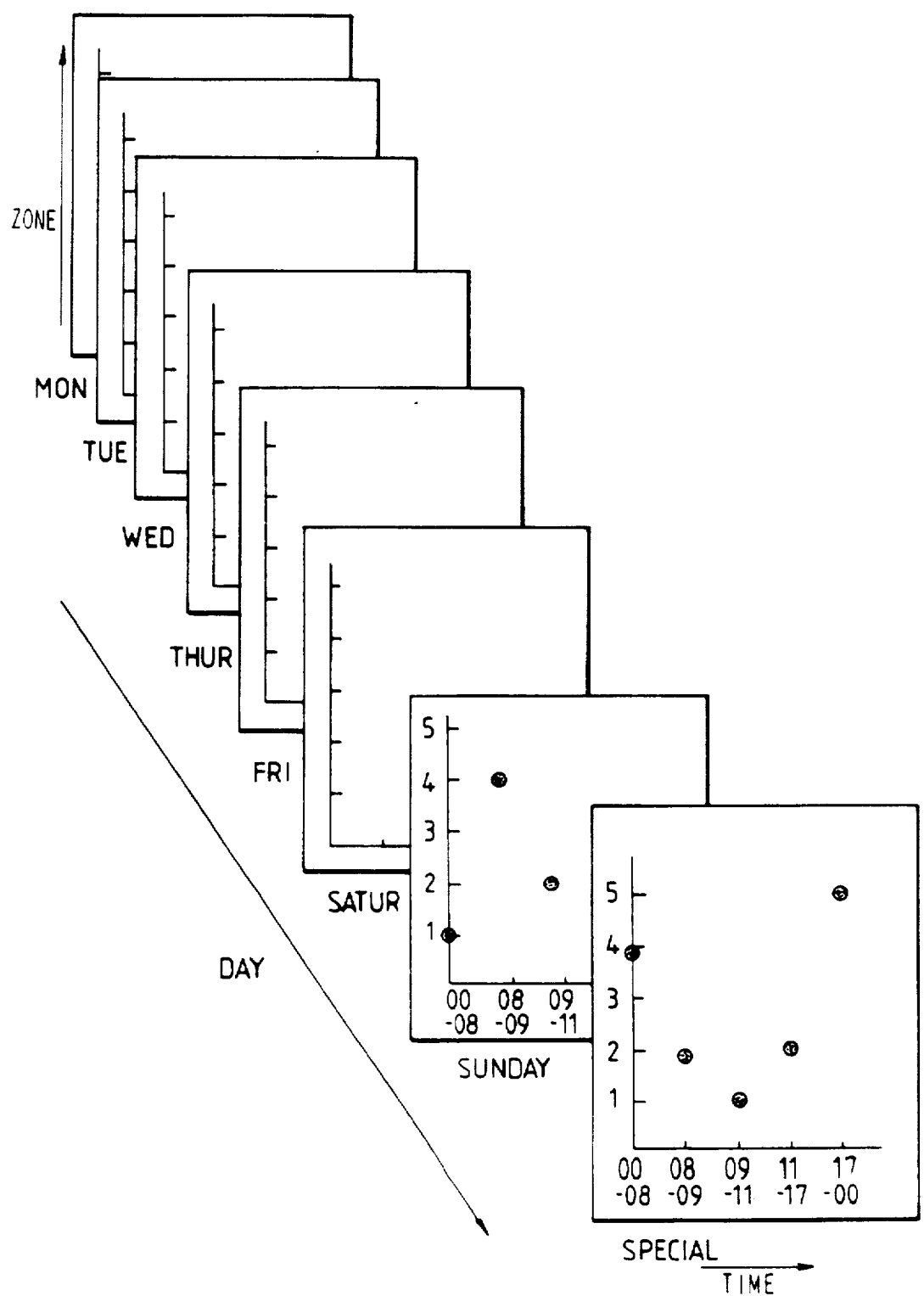
FIG. 2 shows a diagrammatic representation of Day/Time/Zone tables for use with the present invention.

In DPNSS switching nodes, time is divided into bands common to all days of the week. The x-axis scale shown in FIG. 2 represents time bands. The number "00" represents midnight, the other number indicating an hour. For example, the time band "00–08" represents the time period from midnight to 8:00 A.M. The y-axis scale indicated in FIG. 2 represents zones. The axes in both directions are interpreted at specific intersection points only. For each particular day of the week a Zone number is associated with each band. Different bands may have different (or the same) Zone numbers. A special field (identified as SPECIAL in FIG. 2) associated with each time band is for the Zone number to use on exceptional days like Public Holidays. The time bands may be altered but the maximum number is fixed at installation. The Zone number for a time band on a particular day may be altered by management command. It is also possible to temporarily override a Zone number during a given time band replacing it with another Zone number. Zone numbers provide a way of labelling a time band and connecting it to other tables.

A Route Restriction Table is a table (or set of tables—one per Zone) for controlling access to Trunk Groups. For each Zone, access to the various Trunk Groups is limited to those having particular TACs. This means that routes or Trunk Groups may be restricted for use by certain classes of traffic.

Figure 3:
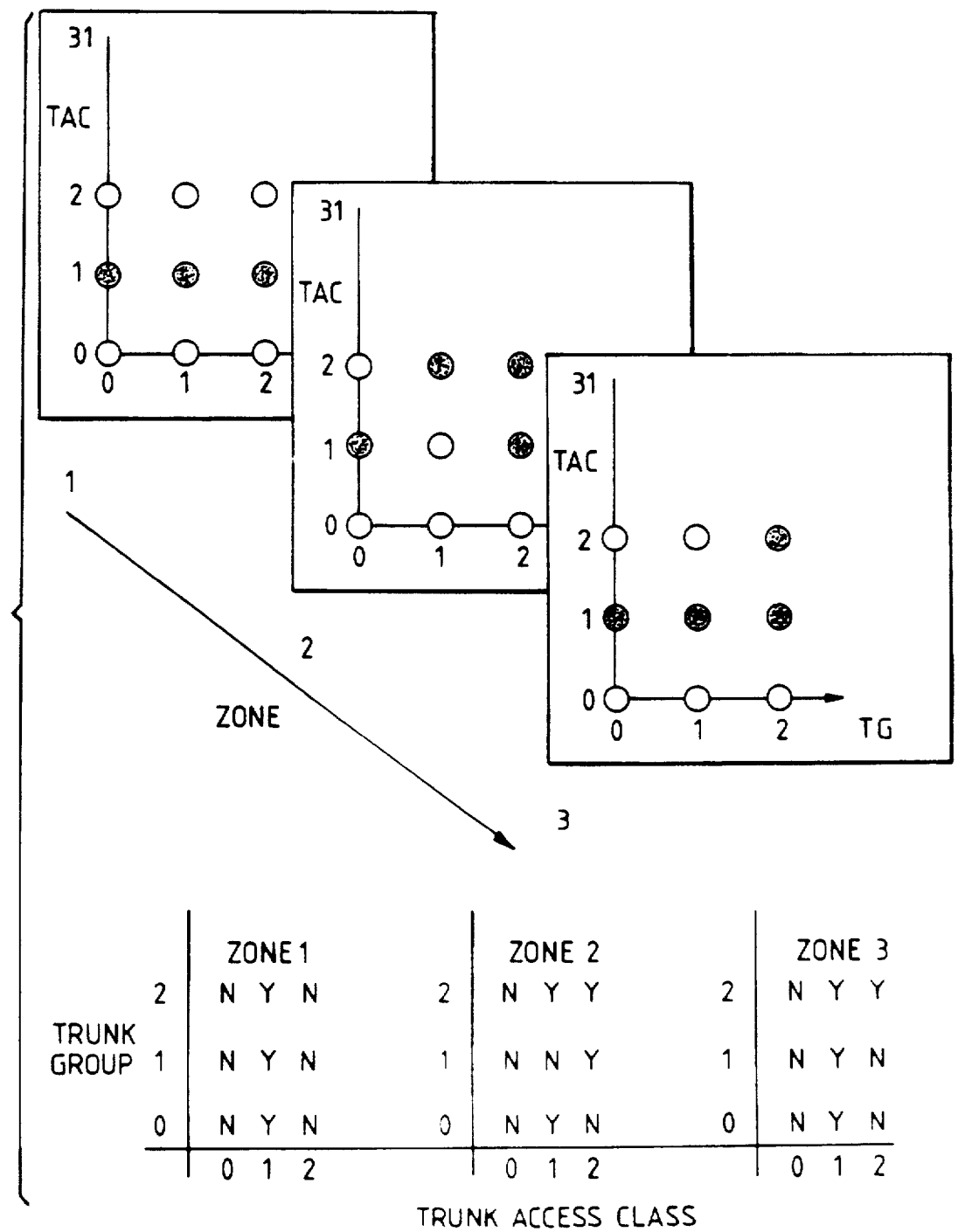
FIG. 3 shows typical Route Restriction Tables for use with the present invention.

Examples of Day/Time/Zone and Route Restriction Tables are shown in FIGS. 2 and 3 respectively. The Route Restriction Tables are shown in FIG. 3 in two forms, graphically above, and as a table below. The graphical representation in each case is equivalent to the table vertically below it. This allocation is shown in the route restriction table by Y(=Yes) showing where use is being made of a particular trunk group by a particular traffic class and TAC and N(=No) showing where use is not being made of the trunk group.

An Access Code is a number used to identify a number of Trunk Groups (usually going to the same destination). Each Trunk Group may only have one Access Code.

Bandwidth allocation may be carried out by the following method; each route to a given destination can be broken down into Trunk Groups with the same Access Code. Each call made with the Access Code has an associated TAC. Each TAC is given a reference number, such as for example, TAC30. The particular number does not have a specific meaning. The TAC may be used to determine if a connection should be allowed to use a particular Trunk Group within that set referenced by the Access Code by using the route restriction tables. Such an allowance is indicated by 'Y' (Yes) in the tables and the white dots correspond to 'N' in the tables of FIG. 3, as opposed to 'N' (No) where allowance is not granted. The black dots on the chart in FIG. 3 correspond to 'Y' in the tables. By allocating one set of TACs to, for example, data calls and the rest to voice it is possible to allocate Trunk Groups to either data or voice calls. This would divide the bandwidth between data and voice calls in a proportion determined by a management system.

By altering the number of circuits in the trunk groups or altering the route restriction table it is possible to change the bandwidth allocated to different classes of traffic. This would need to be done at the switching nodes at both ends of the link.

For dynamic bandwidth allocation on a link, the route restriction table and the table which groups trunks into trunk groups will need to be changed dynamically in the switching nodes at both ends of the link. This is achieved as follows; The new tables are set up in a spare non active Zone in each node, for example by copying the current tables to the tables in the non active Time Zone and then making the changes required. The switching nodes at each end of the link are then instructed to use the new Zone, thus bringing into action the new set of tables.

Figure 1:
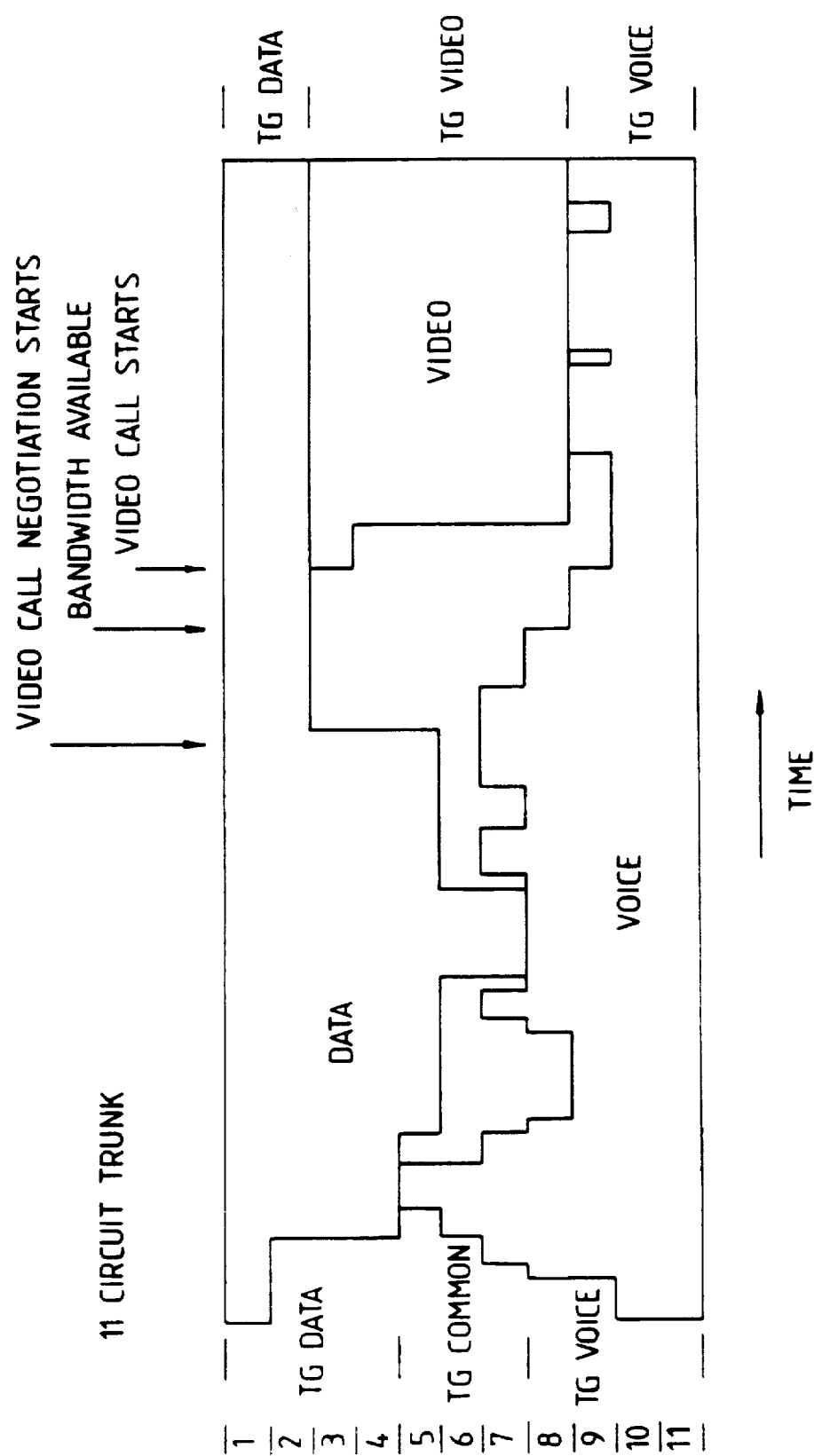
FIG. 1 shows a diagrammatic representation of a typical bandwidth reservation pattern created when using the present invention.

Taking a simple scenario as illustrated in FIG. 1 where there is a link of 11 trunks, some voice calls and one variable bandwidth data call and a video call is to be set-up. The 11 channels in a link are shown with the data call filling from the top down and voice calls filling from the bottom up. Time progresses from left to right.

Initially, there are three trunk groups as shown in the trunk group table: one for data only (circuits 1, 2, 3 and 4), one for voice (circuits 8, 9, 10 and 11), and one for both (circuits 5, 6 and 7). The trunk groups are chosen so that the single service trunk groups are used in preference to the common trunk group. In this state, as can be seen in the diagram, voice and data contend for the common trunk group, but do not use the other's reserved trunk group even when there is spare bandwidth there.

| Trunk Group Table | |
|---|---|
| Trunk Group | Circuits |
| 1 | 1, 2, 3, 4 |
| 2 | 8, 9, 10, 11 |
| 3 | 5, 6, 7 |

It should be noted that similar trunk groups must be set up at both ends of the link although the numbering of the groups may be different at each end as the number is a local matter to the switch.

The TACs are allocated as shown in the following TAC allocation table. Voice has a number of different TACs for different priority users as would be expected in a real system. Data and video could also have number of TACs.

| Allocation Table | |
|---|---|
| Traffic Class | TAC |
| Voice | TAC 1 |
| Voice | TAC 2 |
| Voice | TAC 3 |
| Voice | TAC 4 |
| Data | TAC 20 |
| Video | TAC 30 |

The route restriction table below shows that voice will use trunk group 2 and overflow into trunk group 3, data will use trunk group 1 and also overflow into trunk group 3 and video has no access.

| Route Restriction Table | | | |
|---|---|---|---|
| TAC | | | |
| 30 | N | N | N |
| 20 | Y | N | Y |
| 4 | N | Y | Y |
| 3 | N | Y | Y |
| 2 | N | Y | Y |
| 1 | N | Y | Y |
|  | 1 | 2 | 3 |
|  | Trunk Group | | |

Then a 6 channel video call is booked. It is decided that to fit the 6 channels in, the voice trunk group will be reduced to 3 channels, the data trunk group to 2 channels and the common trunk group to zero. A new trunk group 4 for the video using channels 3, 4, 5, 6, 7 and 8 is created. The trunk group table is now:

| Trunk Group Table | |
|---|---|
| Trunk Group | Circuits |
| 1 | 1, 2 |
| 2 | 9, 10, 11 |
| 3 | none |
| 4 | 3, 4, 5, 6, 7, 8 |

Changing the trunk groups has no effect on existing calls and as data calls are likely to be of long duration, they need to be stopped. The equipment that has set up this data call is instructed to reduce its bandwidth to 2 channels. This happens fairly immediately as can be seen in the diagram. The voice calls are allowed to continue as normal, so time elapses until these terminate on their own accord. Any new voice call that is set up will use the voice trunk group.

Eventually the video trunk group empties so the video call can be set up. To allow this the route restriction table is changed as below:

| Route Restriction Table | | | | |
|---|---|---|---|---|
| TAC | | | | |
| 30 | N | N | N | Y |
| 20 | Y | N | Y | N |
| 4 | N | Y | Y | N |
| 3 | N | Y | Y | N |
| 2 | N | Y | Y | N |
|  | N | Y | Y | N |
|  | 1 | 2 | 3 | 4 |
|  | Trunk Group | | | |

The video sets up an initial call to the other end, exchanges control information, then sets up the rest of the channels. When the video call terminates, the trunk groups are returned to the initial state.

The scenario above and the diagram are slightly artificial in its depiction of what happens in the sense that once a voice call is set up on a channel it stays on that channel until it terminates. The diagram implies that existing calls fall back from the common to the voice trunk group when a channel is available there. This is statistically true with a reasonable number of channels and call duration. In a real scenario, more than the required bandwidth would be allocated to the video trunk group, as it is expected that some voice calls that were occupying the required channels would terminate and some would continue (no new calls would be set up). Traffic patterns need to be examined to determine how many extra channels should be allocated to achieve the required bandwidth.

We claim:

1. A method of allocating trunk circuits of different classes of traffic having different bandwidths in a Digital Private Network Signalling System (DPNSS) link between two switching nodes to provide dynamic allocation of bandwidth within the link, comprising the steps of:

(i) allocating each circuit between two switching nodes of a DPNSS link to a specific Trunk Group of a plurality of Trunk Groups, each Trunk Group having an Access Code;

(ii) allocating at least one of said plurality of Trunk Groups to a Trunk Access Class whereby each TAC is associated with at least one call initiator and restricted to one class of traffic, each TAC being identified within Route Restriction Tables by said one class of traffic as having access barred or non-barred;

(iii) creating a plurality of time bands, each of which is allocated to a Time Zone number; and (iv) creating the Route Restriction Tables for controlling access to the Trunk Groups, whereby for each time band, access to Trunk Groups by a call initiator is restricted to those having a TAC associated therewith which is identified as having access non-barred.

2. A method as claimed in claim 1, further including provision for amending Trunk Groups, TACs and Route Restriction Tables simultaneously by creating an additional time band and an additional Time Zone number to which the additional time band is allocated, whereby the allocation of the circuits may be amended at the commencement of the additional time band.

3. A method as claimed in claim 2, further including provision for carrying out any reduction in the number of circuits available for data traffic at the commencement of the additional time band and carrying out any reduction in the number of circuits available for voice traffic when a respective voice call is normally terminated.

* * * * *